United States Patent Office 3,440,190
Patented Apr. 22, 1969

3,440,190
OLIGONUCLEOTIDE COMPOSITIONS AND THE
PROCESS FOR THE PREPARATION THEREOF
Lester R. Melby, Wilmington, Del., assignor to E. I. du
Pont de Nemours and Company, Wilmington, Del., a
corporation of Delaware
No Drawing. Filed Sept. 8, 1965, Ser. No. 485,946
Int. Cl. C07c 7/12; C08f 19/04, 41/02
U.S. Cl. 260—17.4     7 Claims

ABSTRACT OF THE DISCLOSURE

Oligonucleotide compositions and process wherein the 5'-hydroxy group of a deoxyribonucleoside is attached to an insoluble styrene/divinylbenzene/trityl i.e. styrene/divinylbenzene/vinyltriphenylmethyl polymer through trityloxy i.e., triphenylmethoxy linkages, and wherein the 3-position of the nucleoside is optionally joined to 3'-O-acylnucleoside 5'-phosphate through 3'→5' phosfhodiester bonds followed by removal of the 3'-O-acyl group and further condensation of the liberated 3' hydroxyl with nucleoside phosphate; said compositions are useful for the selective separation of aromatic and aliphatic hydrocarbons.

DESCRIPTION OF THE INVENTION

This invention relates to oligonucleotide syntheses, and more particularly, to novel oligonucleotide intermediates, and to a process for the formation of synthetic oligonucleotides.

Heretofore, oligonucleotides, i.e., phosphodiesters derived from phosphoric acid and nucleoside moieties and which usually contain a relatively small number of nucleotide units, have generally been synthesized by means of homogenous reactions requiring laborious separations and purifications for each of the many steps employed. In the present invention, an unusual heterogeneous reaction scheme has been discovered, in which the formation of oligonucleotides has been achieved by means of a high molecular weight oligonucleotide-containing polymer comprised of 0.05–0.5 repeat units having the structure

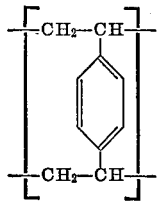

and 2–30 repeat units having the structure

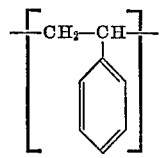

for each repeat unit having the structure

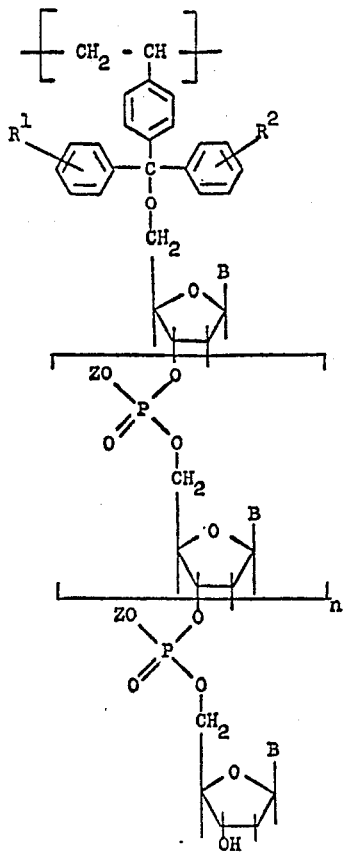

wherein $R^1$ and $R^2$ each is selected from the group consisting of hydrogen, methoxy and dimethylamino; Z is selected from the group consisting of hydrogen,

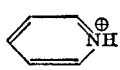

$(R)_3NH^{\oplus}$, and $R_4N^{\oplus}$ wherein R is alkyl of 1–4 carbon atoms; each B, which can be the same or different, is selected from the group consisting of

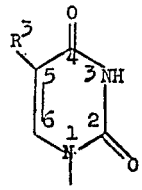

(1,2,3,4-tetrahydro-2,4-dioxo-1-pyrimidinyl and those with 5-chloro, -fluoro, and -methyl substituents)

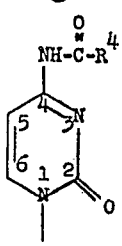

(4-hydrocarbylcarbonamido-1,2-dihydro-2-oxo-1-pyrimidinyl)

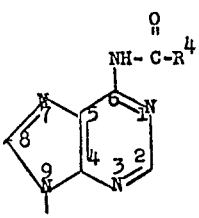

(6-hydrocarbylcarbonamido-9-purinyl)

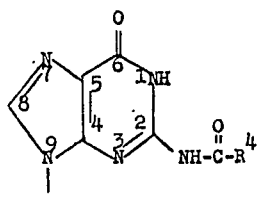

(2-hydrocarbylcarbonamido-1,6-dihydro-6-oxo-9-purinyl)

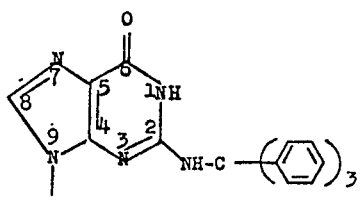

(2-triphenylmethylamino-1,6-dihydro-6-oxo-9-purinyl)

4-amino-1,2-dihydro-2-oxo-1-pyrimidinyl,
6-amino-9-purinyl, and
2-amino-1,6-dihydro-6-oxo-9-purinyl, wherein $R^3$ is selected from the group consisting of hydrogen, methyl, chlorine and fluorine, and $R^4$ is selected from the group consisting of alkyl of 1–3 carbon atoms, phenyl, methoxyphenyl, and alkylphenyl wherein said alkyl group has 1–3 carbon atoms; and $n$ is an integer from 0 to 100.

The oligonucleotide-containing polymers of my invention are prepared in a step-wise fashion using a carrier polymer as an insoluble support upon which the oligonucleotide-containing is built. The carrier polymer must be so chosen that it will be able to undergo a facile reaction with a suitable nucleoside to provide a chemical attachment of the nucleoside to the support. On the other hand, however, the chemical attachment must be sufficiently weak to permit the separation of the polymeric carrier from the subsequently-formed oligonucleotide under mild chemical conditions.

The chemical attachment of the initial nucleoside moiety to the carrier is achieved in the present invention through use of triphenylmethyl chloride (or substituted triphenylmethyl, particularly methoxy) which itself is chemically bonded to a polymeric carrier from one of its aromatic ring positions. Triphenylmethyl chloride reacts specifically with the 5'-hydroxy group of a ribo- nucleoside or deoxyribonucleoside to form a nucleoside 5'-O-triphenylmethyl ether as exemplified by the following equation employing a 2'-deoxyribonucleoside wherein B is as defined hereinabove.

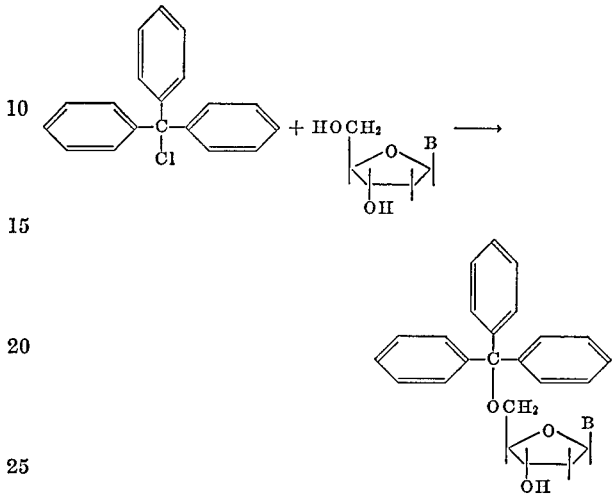

The trityl group thus serves to protect the 5'-hydroxy group of the nucleoside while leaving the 3'-hydroxy group free for subsequent condensation with a suitably 3'-protected nucleoside 5'-phosphate (nucleotide) to form the 3'→5' phosphodiester which is characteristic of naturally occurring nucleic acids. This reaction is depicted by the following equation wherein the triphenylmethyl or trityl group has been abbreviated as Tr, B and Z are as defined hereinabove and Q is a protective acyl radical derived from an organic monocarboxylic acid, for example, acetyl, benzoyl or anisoyl.

The 3'-protecting group Q then is removed, for example, under basic conditions, and the chain length is increased by another condensation with a nucleoside 5'-phosphate. This sequence of reactions is continued until the oligonucleotide of the desired chain length is achieved.

In the above reaction sequence, the same nucleotide may be employed throughout, i.e., the B or basic moieties of all the ribofuranoside units, including the one from the initial ribofuranoside linked to polymer, may be the same, or two or more suitable nucleotides may be utilized to form an oligonucleotide containing a variety of basic (purine or pyrimidine) moieties. Finally, the trityl group is removed, for example, under mild acid conditions or by catalytic hydrogenolysis, to liberate the desired oligonucleotide.

In the present invention, it has been found that a suitable carrier polymer containing the requisite pendant triphenylmethyl chloride moiety can be prepared by a sequence of reactions which comprises, first, copolymerizing styrene, p-iodostyrene and divinylbenzene to produce a terpolymer; replacing the iodo substituent with a lithio substituent, thus forming a polymeric organolithium compound; reacting the organometallic with benzophenone, or a substituted benzophenone as described infra, to produce a triphenylmethyl alcohol; and finally, converting the hydroxy group to a chloro group by conventional means to yield the desired carrier, namely, a terpolymer of styrene, divinylbenzene and p-(chlorodiphenylmethyl) styrene or p-(chloro-bis-monosubstituted phenylmethyl) styrene. The general preparation of the terpolymers has been described in the literature by D. Braun et al., Chem. Ber., 97, 3098 (1964) and D. Braun, Angew. Chemie, 73, 197, (1961).

The composition of the terpolymers operable herein should be such that they contain 0.05–0.5 polymer repeat units derived from divinylbenzene and 2–30 polymer repeat units derived from styrene for each polymer repeat unit derived from the p-substituted styrene. As indicated above, in the aforesaid sequence of reactions, the one involving the conversion of the organolithium terpolymer to the alcohols may be carried out either with benzophenone or with a substituted benzophenone as one of the reactants.

In the present invention substituted benzophenones, and particularly, benzophenones wherein each phenyl group is monosubstituted with a methoxy or dimethylamino group, and especially benzophenones substituted with such groups in the p,p'-positions, are preferred since the presence of such groups allows a more facile separation of the oligonucleotide from the polymeric carrier. For simplification, hereinafter the polymeric carrier containing the triphenylmethyl moiety, also, may be referred to by the designation PTr. Moreover, it is to be understood that the previously described general reactions involving the use of triphenylmethyl chloride and a ribo- or deoxyribonucleoside are equally applicable when PTrCl is substituted therein for trityl chloride.

The interaction of the trityl chloride polymer with either a free ribonucleoside or 2'-deoxyribonucleoside or a 3'-Q-protected ribonucleoside or 2'-deoxyribonucleoside, with Q being a protective group as defined above, is carried out in a basic liquid reaction medium at 0° to 100° C., at either atmospheric or superatmospheric pressures, for at least 1 hour and up to 2 weeks. Basic liquid reaction media include pyridine, pyridine-benzene mixtures, pyridine-dimethylformamide (DMF) mixtures, pyridine-dimethylacetamide (DMA) mixtures, tertiary amines (particularly triethylamine), tertiary amine (particularly triethylamine)-benzene mixtures, tertiary amine (particularly triethylamine)-dimethylformamide or dimethylacetamide mixtures, and mixtures of pyridine or tertiary amines (particularly triethylamine) with dioxane, tetrahydrofuran, acetonitrile or dimethylsulfoxide. Preferred herein are the first four just designated, i.e., pyridine or the pyridine-benzene, DMF or DMA mixtures. Preferably, the condensation reaction is carried out at 20 to 30° C. and atmospheric pressure for 1 hour to 2 days. The reaction may be carried out either in daylight or in darkness, but preferably in the dark.

If the initial interaction of the trityl chloride polymer is with, for example, a suitable 3'-protected 2'-deoxyribonucleoside as shown by the following equation

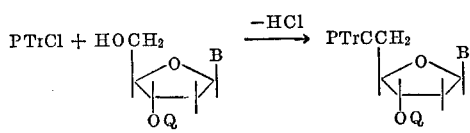

the protective Q group at the 3'-position must be hydrolytically removed prior to the next condensation step. The hydrolysis is carried out in a basic liquid reaction medium employing, for example, concentrated ammonium hydroxide, pyridine saturated with aqueous ammonia or sodium hydroxide, or a benzene-pyridine mixture saturated with aqueous ammonia. The hydrolysis reaction temperature is 0° to 100° C., preferably 20–30° C., and the reaction time varies from 10 minutes to 48 hours.

After the removal of the 3'-protecting group Q by a basic hydrolysis the nucleoside-containing polymer is condensed with a suitably 3'-protected nucleotide, i.e., a 3'-protected nucleoside 5'-phosphate to produce a phosphate diester (oligonucleotide). The condensation is carried out in a basic liquid reaction medium at 0°–100° C. and atmospheric pressure either in daylight or in darkness, in the presence of a carbodiimide, an aromatic sulfonyl halide or an aromatic carbonyl halide having lower alkyl especially methyl in both ortho positions.

Operable carbodiimides can be represented by the formula $R^5N=C=NR^6$ wherein $R^5$ and $R^6$ can be the same or different and are selected from the group consisting of alkyl, cycloalkyl and aryl. Particularly preferred carbodiimides are those wherein $R^5$ and $R^6$ are the same and are either cyclohexyl or isopropyl. Representative of the operable halides are p-toluenesulfonyl chloride, mesitylenesulfonyl chloride and mesitoyl chloride. The basic liquid reaction media which are operable herein are the same as those indicated hereinabove for the condensation of the trityl chloride polymer and the 2'-deoxyribonucleoside. Preferably, the nucleotide condensation reaction is carried out at 20–30° C. and atmospheric pressure, in the dark.

The sequence of reactions involving the removal of the 3'-protecting group Q followed by a condensation reaction between the newly formed free 3'-hydroxy group of the oligonucleotide polymer and a 3'-protected nucleotide (nucleoside 5'-phosphate) is repeated until the desired oligonucleotide chain length is achieved. As indicated above, chains can be formed from a single nucleotide or from a variety of nucleotides. When the desired length and composition of chain has been achieved, the trityl polymeric carrier is removed to yield a free 5'-hydroxy group.

Two methods are available for the removal of the polymeric carrier. In one method the carrier-oligonucleotide is treated with 80% aqueous acetic acid for 0.5 to 48 hours at 0°–100° C. and atmospheric pressure. The acetic acid can be saturated with benzene if desired. Preferably the hydrolysis is carried out at 0° C. to room temperature of about 25° C. The polymeric carrier also can be removed by a catalytic hydrogenolysis at atmospheric or superatmospheric pressures in the presence of a basic liquid reaction medium. The hydrogenolysis is effected by means of hydrogen and PdO, $PtO_2$ or either of these two catalysts supported on charcoal, barium sulfate or kieselguhr. The pressure generally is in the range of atmospheric pressure to 1000 atm., and preferably in the range of 1–2 atm. The reaction temperature is in the range 0°–100° C., and preferably 20–30° C. The basic liquid reaction medium may be dimethylformamide, diethylacetamide, or mixtures thereof with benzene or pyridine.

Finally, after removal of the polymeric carrier from one end of the oligonucleotide the 3'-protecting group Q can be removed from the other end of the oligonucleotide by a previously described basic hydrolysis. Alternatively, the protective group Q can be removed prior to the separation of the oligonucleotide from the polymeric carrier.

By means of this invention, therefore, there can be prepared oligonucleotides having the structure

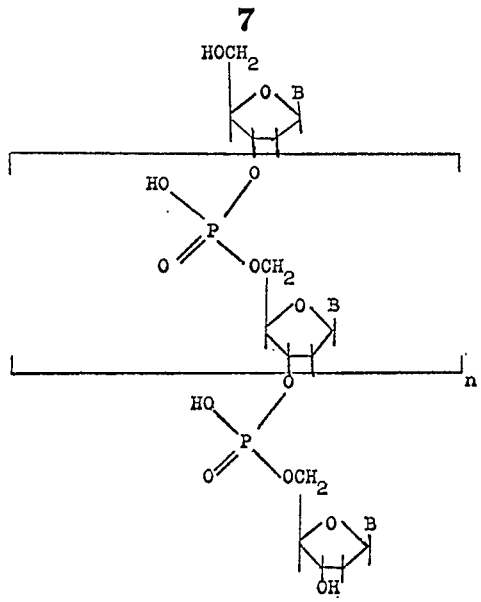

wherein B and $n$ are as previously defined.

The following examples described various embodiments of the invention in greater detail. It is to be understood that these embodiments do not comprise the entire invention but are intended, rather, to be illustrative of a broader inventive concept for which protection by the patent laws is being sought. The invention in its broader context finds supporting disclosure throughout the entire specification and not in the examples alone. The following comments are made with regard to materials and procedures described in the examples.

Nucleosides and nucleotides were obtained from commercially available sources and were used without further purification. All nucleosides used herein are glycosides of $\beta$-D-2'-deoxyribofuranose and a purine/or pyrimidine, although glycosides of $\beta$-D-ribofuranose equally are operable. The nucleotides employed are phosphates of such nucleosides.

The pyridine employed was a reagent grade pyridine which was purified by drying for several days over calcium hydride followed by distillation from chlorosulfonic acid (15 ml. per liter) and stored over a commercially available molecular sieve (1/16 in. pellets, Type 10X available from Linde Air Products, Inc.).

The dimethylformamide (DMF) utilized was a technical grade which was vacuum distilled and stored over a commercially available molecular sieve as described above.

Thin layer chromatography was conducted on 20 cm. plates (long dimension) coated with a commercially available a fluorescent cellulose (MN-Cellulose Powder 300 $F_{254}$, produced by Macherey-Nagel and Co.). Chromatogram spots were observed under a 2537 A. ultraviolet lamp. Paper chromatography was conducted on Whatman 3MM or Whatman 1 filter paper.

Evaporations were carried out with a Buchler Flash Evaporator. Rotary mixing was effected with a variable speed motor equipped with a unidirectional rotor.

Ultraviolet spectra were obtained using a Perkin-Elmer Model 202 Ultraviolet Spectrophotometer with 1 cm. cells. The amount of material was determined from the optical density (OD) at maximum absorption using the equation $$\text{micromoles of compound} = \frac{\text{solution volume (ml.)} \times \text{OD} \times 10^3}{\text{Molar extinction coefficient}}$$

EXAMPLE I.—PREPARATION OF INTERMEDIATES (A) Styrene-iodostyrene-divinylbenzene copolymers (1) Bulk polymer: 10:1 styrene/iodostyrene, crosslinked with 2 weight percent divinylbenzene.—A mixture of 26 g. of freshly distilled styrene, 5.7 g. of p-iodostyrene (recrystallized from hexane), 0.6 ml. of divinylbenzene and 0.35 g. of benzoyl peroxide was added to a solution of 0.45 g. of a commercially available polyvinyl alcohol (having about a 5 cp. viscosity as a 4 weight percent aqueous solution at 70° F. and having about 12 weight percent (average) residual polyvinyl acetate) in 250 ml. of deaerated water contained in a 500 ml., 3-neck flask equipped with a reflux condenser and mechanical stirrer. The mixture was vigorously stirred and heated at 80° C. for 18 hours. The aqueous layer was decanted, the chunky solid was washed with water by decantation and collected on a filter. It was suspended in 500 ml. of methanol and washed in a high-speed blender. The methanol wash was repeated and the product was collected and dried in a vacuum oven at 80° C. overnight; yield 23.6 g. (73% based on monomers charged).

Analysis.—Found: C, 81.7, 81.4; H, 6.8, 6.5; I, 10.9, 10.8. Calcd. for 10 to 1 styrene/iodostyrene copolymer $C_{88}H_{87}I$ (MW 1271): C, 83.1; H, 6.9; I, 10.0.

The assigned degree of crosslinking is based on the divinylbenzene charged.

(2) Bead polymer: 10:1 styrene/iodostyrene crosslinked with 1 weight percent divinylbenzene.—A 1-liter, 3-neck flask equipped with a mechanical stirrer and reflux condenser was charged with 240 ml. of deaerated water and 3.6 g. of medium viscosity polyvinyl alcohol (having about a 25 cp. viscosity as a 4 weight percent aqueous solution at 70° F. and having about 12 weight percent (average) residual polyvinyl acetate) and the mixture was stirred under nitrogen overnight. All joints were protected by polytetrafluoroethylene sleeves. The following monomerinitiator charge was used:

| | |
|---|---|
| Styrene _____ g__ | 20.8 |
| p-Iodostyrene _____ g__ | 4.6 |
| Divinylbenzene _____ ml__ | 0.25 |
| Benzoyl peroxide _____ g__ | 0.25 |

While being stirred at a moderate rate the mixture was heated under nitrogen to 80–85° C. during one-half hour and was maintained under these conditions for an additional 4 hours. The mixture was allowed to cool to about 60° C. and the free-flowing bead polymer was collected on a coarse-frit funnel and washed on the funnel with 500 ml. of water and then with 500 ml. of methanol. It was transferred to a bottle containing 200 ml. of benzene and the bottle was rotated mechanically for one hour. The translucent swollen beads were collected on a coarse-frit funnel. When washed with 500 ml. of methanol the product became an opaque, free-flowing powdery solid. Microscopic examination indicated the beads to be about 100–200 mesh size ($\sim$100$\mu$ diameter). The product was dried for 24 hours in a vacuum oven at 70° C.; yield 19.3 g. (73%).

Analysis.—Found: C, 83.8, 83.6; H, 6.4, 6.3; I, 9.9.

(3) Bead polymer: 10:1 styrene/iodostyrene crosslinked with 2 weight percent divinylbenzene.—The polymerization scheme described under (2) was repeated except that 0.5 ml. of divinylbenzene was used. The yield was 21.3 g. (82.5%).

Analysis.—Found: C, 82.7, 82.6; H, 6.8, 7.0; I, 10.0.

(4) Bead polymer: 15:1 styrene/isodostyrene crosslinked with 1 weight percent divinylbenzene.—Polymerization scheme (2) was carried out, but the monomer charge was as follows:

| | |
|---|---|
| Styrene _____ g__ | 21.4 |
| p-Iodostyrene _____ g__ | 3.2 |
| Divinylbenzene _____ ml__ | 0.25 |
| Benzoyl peroxide _____ g__ | 0.25 |

The polymer yield was 16.8 g. (67%).

*Analysis.*—Found: C, 84.7, 84.9; H, 7.1, 7.1; I, 7.5. Calcd. for 15 to 1 styrene/iodostyrene copolymer $$C_{128}H_{127}I$$

(M.W. 1790): C, 86.0; H, 7.0; I, 7.0.

(5) Bear polymer: 15:1 styrene/iodostyrene cross-linked with 2 weight percent divinylbenzene.—A polymerization analogous to (4) was conducted, but the divinylbenzene charge was increased to 0.5 ml. The yield was 20.7 g. (82.5%).

*Analysis.*—Found: C, 85.3, 85.5; H, 7.2, 7.3; I, 7.1.

(B) Conversion of iodo-polymers to triphenylmethyl derivatives (1) A triphenylmethyl alcohol.—A suspension of 5.8 g. of the finely divided iodopolymer from A (1) in 50 ml. of sodium-dried benzene was reacted with 6.5 ml. of n-butyllithium in hexane (15% by weight butyllithium, density 0.68 g./ml.) and the mixture was magnetically stirred at room temperature under nitrogen for 8 hours. A solution of 2.0 g. (~10 mmoles) of benzophenone in 10 ml. of benzene was added and stirring was continued overnight. A mixture of 10 ml. of glacial acetic acid and 5 ml. of benzene was added and the mixture was stirred for 4 hours. The polymer was collected and washed on a filter with 50 ml. of benzene, 100 ml. of 2B (denatured) alcohol, 100 ml. of water, and finally, with 200 ml. of alcohol. It was suspended in 50 ml. of benzene, mechanically mixed for two hours, collected again, washed with 100 ml. of methanol and dried in a vacuum oven at 100° C. overnight. The product was white solid; yield 5.3 g.

*Analysis.*—Found: C, 90.6, 90.3; H, 7.1, 7.0; I, <0.5. Calcd. for complete conversion to the triphenylmethyl alcohol derivative $C_{101}H_{98}O$: C, 91.5; H, 7.4.

When treated with perchloric acid and heated to dryness on a steam bath the polymer developed an intense yellow-orange color characteristic of trityl perchlorates. The polymer fluoresced white when irradiated with 3660 A. ultraviolet light whereas the starting material was not fluorscent.

(2) Triphenylmethyl chloride.—A suspension of 3.2 g. of the trityl alcohol polymer from B (1) in a mixture of 100 ml. of benzene and 5 ml. of acetyl chloride was refluxed for 6 hours and then stirred overnight at room temperature. The product was collected on a sintered glass funnel, with exclusion of moisture, and was washed on the funnel successively with 50 ml. of dry benzene and 200 ml. petroleum ether. It was dried in a high vacuum at room temperature over potassium hydroxide. Allowing for small transfer losses, the recovery was essentially quantitative.

*Analysis.*—Found: C, 89.1, 89.4; H, 7.5, 7.6; Cl, 1.3.

The chlorine content corresponded to about 0.37 μmole per mg. of polymer.

(3) A phenyl bis(p - methoxyphenyl)methyl alcohol (dimethoxytrityl alcohol).—An experiment similar to that described under section B(1) was conducted using 6.0 g. of the iodo-polymer from A(1) and 2.4 g. of 4,4'-dimethoxybenzophenone. The yield of brick-red polymer was 6.25 g.; this polymer was not fluorescent under 3660 A. light.

*Analysis.*—Found: C, 88.2, 88.3; H, 7.3, 7.5. Calcd. for complete conversion to the phenyl bis(p-methoxyphenyl)methyl alcohol $C_{103}H_{102}O_3$ (M.W. 1387): C., 89.1; H, 7.5.

The red color, attributed to trapped dimethoxytrityl ions, was largely discharged by suspending the product in 100 ml. of a 1:1 80% acetic acid: benzene mixture and gently boiling the mixture on a steam bath for 20 minutes. The faintly yellow product was collected, washed and dried as before. It was fluorescent under 3660 A. light. When a portion was warmed to dryness with perchloric acid, it became intensely orange.

*Analysis.*—Found: C., 88.6; H, 7.4.

(4) A phenyl bis(p-methoxyphenyl)methyl chloride (dimethoxytrityl chloride).—Conversion of the polymer alcohol from B(3) to the chloride was carried out as previously described in B(2). The product was a slightly orange solid, fluorescent under 3660 A. light.

*Analysis.*—Found: C., 88.2, 88.6; H., 7.2, 7.1; Cl., 1.7. The chlorine content corresponds to about 0.5 μmole of functional group per mg. of polymer. Calcd. for complete conversion to the chloride $C_{103}H_{101}O_2Cl$ (M.W., 1405): C., 88.0; H., 7.3; Cl., 2.6.

EXAMPLE II.—PREPARATION OF NUCLEOSIDES USING TRITYL-COPOLYMER CARRIER (A) Thymidine-trityl-copolymer and hydrolysis studies A vial was charged with 155 mg. of thymidine (2-deoxyribofuranosyl thymine; vacuum dried at 100° C.), 670 mg. of the trityl chloride polymer from Example IB(2) and 10.0 ml. of anhydrous pyridine. The vial was capped and rotated in a mechanical mixer for two days at room temperature. The polymer was collected on a filter and washed with pyridine (30 ml.) and water. Spectroscopic examination of the filtrate (optical density at 267 mμ) showed 72% recovery of thymidine. The polymer was washed by rotary mixing in 10 ml. of pyridine for 24 hrs. It was collected again and vacuum dried at 100° C. overnight; recovery, about 650 mg.

The infrared spectrum (Nujol mull) showed a carbonyl band at 1675 cm.$^{-1}$ characteristic of the thymine nucleus; this band was absent in the spectrum of the starting polymer.

To determine conditions for release of the nucleoside and also to determine the amount of bound nucleoside, portions of the polymer were subjected to the various hydrolytic procedures. The amount of thymidine in each hydrolysate was determined spectrophotometrically ($OD_{267m\mu}$) after stripping the filtrate and dissolving the residue in a known volume of 0.01 N hydrochloric acid. Results are summarized in Table I. For these analyses 10 mg. of polymer in 6 ml. of the appropriate hydrolysis medium was heated as described, the mixture was stripped to dryness, then three 5-ml. portions of 5% ammonium hydroxide were successively added and stripped out, followed by stripping with three 5-ml. portions of water. The residue was taken up in 25.0 ml. of 0.01 N hydrochloric acid, the solution was filtered and the UV spectrum of the filtrate was determined.

TABLE I.—HYDROLYSIS OF THYMIDINE-TRITYL-COPOLYMER

| Medium | Temperature, ° C. | Time, hrs. | Micromoles thymidine released per mg. of polymer |
| --- | --- | --- | --- |
| Pyridine | 25 | 24 | 0.00 |
| 80% HOAc | 25 | 24 | 0.00 |
| 80% HOAc sat. with benzene | 25 | 18 | 0.00 |
| Do | (¹) | ¼ | 0.00 |
| 80% HOAc | (¹) | ¾ | 0.06 |
| Do | (¹) | ½ | ² 0.15 |
| HOAc-6N HCl (1:1, by vol) | (¹) | 16 | 0.20 |

¹ Reflux.
² 35 mg. per g. of Polymer.

The last experiment in the table was designed to give a measure of the total nucleoside content of the polymer by quantitative conversion to the base thymine.

(B) N-anisoyl-2'-deoxycytidine-trityl-copolymer

In condensation reactions involving 2-deoxycytidine it is necessary to obviate undesirable side reactions by protecting the free amino group of the cytosine moiety; to achieve this the N-anisoyl nucleoside is employed rather than free 2-deoxycytidine.

The reaction of the trityl chloride polymer from Example IB(2) was conducted as described above in A, but instead of thymidine, 204 mg. of N-anisoyldeoxycytidine, which was prepared by the procedure of Schaller et al., J. Am. Chem. Soc., 85, 3824 (1963), was used.

The infrared spectrum of the polymer (Nujol mull) exhibited a doublet band at 1650 cm.$^{-1}$ characteritsic of the nucleoside.

Hydrolysis in refluxing 80% acetic acid for 90 minutes followed by analysis of the hydrolysate indicated a nucleoside content of about 0.1 μmole per mg. of polymer ($OD_{260\ m\mu}$). This value, however, is inconclusive because the nucleoside is extensively but not completely cleaved to anisic acid and deoxycytidine under these conditions.

EXAMPLE III.—PREPARATION OF NUCLEOSIDES USING PHENYL BIS(P - METHOXYPHENYL) METHYL-COPOLYMER CARRIER (A) Thymidine-dimethoxytrityl-copolymer A mixture of 80 mg. of thymidine and 1.0 g. of dimethoxytrityl chloride polymer from Example IB(4) in 20 ml. of anhydrous pyridine was treated as described under Example IIA above. The initially isolated solid product, after being washed with pyridine and water, was suspended in 20 ml. of pyridine for 4 days, with occasional mixing, to insure removal of mechanically occluded thymidine. The product was collected and vacuum dried at 100° C.

Ultraviolet spectral analysis of the acetic acid hydrolysate (reflux, 80% acetic acid, 1 hr.) indicated a thymidine content of 0.21 μmole per mg. of polymer. This value corresponds to reaction with somewhat less than half of the available chloride in the precursor. The infrared spectrum (Nujol mull) of the thymidine polymer showed a strong band at 1675 cm.$^{-1}$ indicative of the thymine carbonyl groups.

(B) Thymidine-dimethoxytrityl-copolymers

The iodo bead polymer of Example IA(4) was converted to the dimethoxytrityl alcohol derivative with n-butyllithium and dimethoxybenzophenone as previously described in Example IB(3)

*Analysis.*—Calcd. for $C_{149}H_{140}O_3$: C, 90.2; H, 7.4; I, 0.0. Found: C, 80.5; H, 7.5; I, 0.3.

This alcohol derivative was treated with acetyl chloride in benzene as described in Example IB(4) to obtain the dimethoxytrityl chloride derivative.

The iodo bead polymer of Example IA(2) was converted to the dimethoxytrityl chloride polymer as described previously in Example IB(3)–(4).

*Analysis.*—Found: C, 88.5; H, 7.5; Cl, 1.8.

A 1 g. portion of the chloride polymer and 95 mg. of N-anisoyldeoxycytidine in 20 ml. of anhydrous pyridine was continuously mixed for seven days and the product was isolated, washed and dried as in Example IIA.

To determine the nucleoside content of the polymer a 10 mg. portion was refluxed for three hours with 5 ml. of 80% acetic acid, the hydrolysate was separated by filtration, the filtrate was stripped, and the residue was dissolved in 50.0 ml. of 0.01 N hydrochloric acid. The optical density at 255 mμ was 1.0, corresponding to a nucleoside loading of 232 μmoles per gram of polymer. This was determined by comparison of the ultraviolet absorption spectrum with that of the hydrolysate of a known amount of pure N-anisoyldeoxycytidine.

(D) N-benzoyl-2'-deoxyadenosine-dimethoxytrityl-copolymer

N-benzoyldeoxyadenosine was prepared according to the method of Schaller et al., J. Am. Chem. Soc., 85, 3824 (1963). A mixture of 93 mg. of this benzoylated nucleoside and 1.0 g. of the chloride polymer prepared for use in Example IIIC in 20 ml. of anhydrous pyridine was continuously mixed at room temperature for 7 days. The product was filtered, the filtrate was stripped, the stripped residue was dissolved in water, and the ultraviolet absorption spectrum was determined. The optical density at 284 mμ indicated that the polymer had taken up 230 μmoles of nucleoside.

EXAMPLE IV.—PREPARATION OF NUCLEOSIDES USING PHENYL BIS(P - METHOXYPHENYL) METHYL-COPOLYMER CARRIER; THYMIDINE-DIMETHOXYTRITYL-COPOLYMER

Another batch of iodo-polymer approximately a 15 to 1 styrene to iodostyrene composition was carried through a series of transformations such as described above to yield a thymidine-dimethoxytrityl-copolymer. The analytical results which are summarized in Table II are consistent with those described above.

TABLE II.—ANALYSES OF THYMIDINE-DIMETHOXYTRITYL-COPOLYMERS AND INTERMEDIATES

| Polymer Functional Group | Molecular Formula for 15 styrene units to 1 Functional Unit | Percent C | Percent H | Percent I or Cl |
|---|---|---|---|---|
| Iodo | Calcd. for $C_{128}H_{127}I$ (M.W. 1,790) | 86.0 | 7.0 | 7.0 (I) |
|  | Found | 85.3 | 7.4 | 7.1 (I) |
| Dimethoxytrityl alcohol | Calcd. for $C_{149}H_{146}O_3$ (M.W. 1,982) | 90.2 | 7.4 | 0.0 (I) |
|  | Found | 89.4 | 7.5 | <0.6 (I) |
| Dimethoxytrityl chloride | Calcd. for $C_{149}H_{145}O_2Cl$ (M.W. 2,000) | 89.4 | 7.3 | 1.8 (Cl) |
|  | Found | 89.0 | 7.4 | ¹ 1.0 (Cl) |

¹ 0.29 μmole/mg.

*Analysis.*—Calcd. for $C_{149}H_{145}ClO_2$: C, 89.4; H, 7.3; Cl, 1.8. Found: C, 89.5; H, 7.7; Cl, 1.6.

A mixture of 0.7 g. of the above chloride and 100.6 mg. of thymidine in 20 ml. of anhydrous pyridine was mixed for five days and treated as in Example IIA. Exhaustive acid hydrolysis showed the product to contain 180 μmoles of bound thymidine per gram of polymer.

The reaction just described was repeated, but the solvent mixture comprised a mixture of 5 ml. of anhydrous pyridine and 10 ml. of anhydrous benzene. The bound thymidine in this product had increased to 305 μmoles per gram.

Alternative to exhaustive hydrolysis in refluxing acetic-hydrochloric acid mixture, the nucleoside was removed from the polymer quantitatively by continuously agitating the polymer (10 mg.) for 2 days in 3 ml. of 80% acetic acid saturated with benzene.

(C) N-anisoyl-2'-deoxycytidine-dimethoxytrityl-copolymer

Thymidine-dimethoxytrityl-copolymer found after 80% acetic acid hydrolysis, 1 hr.: 0.13 μmole thymidine per mg. of polymer.

EXAMPLE V.—PREPARATION OF OLIGONUCLEOTIDES USING THYMIDINE-TRITYL-COPOLYMER CARRIER; TRITYLTHYMIDYLYL-(3'→5')-THYMIDINE-3'-ACETATE-COPOLYMER

Pyridinium 3'-O-acetylthymidine 5'-phosphate was prepared by acetylation of 50 mg. of pyridinium thymidine 5'-phosphate according to the method of Gilham et al., J. Am. Chem. Soc., 80, 6218 (1958). To a solution of this product in 10 ml. of anhydrous pyridine was added, under anhydrous conditions, 300 mg. of the trityl-thymidine copolymer of Example IIA and 250 mg. of dicyclohexylcarbodiimide; the mixture was continuously agitated for 3 days at room temperature. The solid polymer was collected by filtration and washed on the filter with 50 ml. of warm (60° C.) pyridine and 50 ml. of water and was dried under high vacuum over phosphorus pentoxide for 2 days.

The solid polymer was refluxed for 90 minutes with 20 ml. of 80% acetic acid to remove the thymidylylthymidine. The mixture was filtered, the filtrate was stripped dry and the residue was dissolved in 0.5 ml. of concentrated ammonium hydroxide overnight to allow hydrolysis of the 3'-O-acetyl group. The free nucleotide was recovered by conventional means. Thin layer chormatography on cellulose in isopropyl alcohol-concentrated ammonium hydroxide-water (7:1:2) showed the product contained two ultraviolet absorbing components, one spot moving identically with thymidine and the other moving similarly to a reference spot of authentic thymidylyl-(3'→5')-thymidine prepared by a prior art procedure.

EXAMPLE VI.—PREPARATION OF OLIGONUCLEOTIDES USING THYMIDINE- DIMETHOXYTRITYL-COPOLYMER CARRIER; DIMETHOXYTRITYLTHYMIDYLYL-(3'→5')-THYMIDINE-3' - ACETATE-COPOLYMER

A mixture of 600 mg. of the thymidine polymer of Example IIIA, 80 mg. of anhydrous pyridinium 3'-O-acetylthymidine 5'-phosphate and 250 mg. of dicyclohexylcarbodiimide in 20 ml. of anhydrous pyridine was continuously mixed under anhydrous conditions at room temperature for 3 days. The solid polymer was collected on a filter and washed with pyridine, benzene, water and ethanol and then high-vacuum dried.

A 10 mg. portion of the product was hydrolysed by heating at 90° C. for 20 minutes with 0.5 ml. of 72% perchloric acid. Phosphorus analysis on the hydrolysate according to the method taught by Chen et al., Anal. Chem., 28, 1756 (1956) and Ames et al., J. Biol. Chem., 235, 769 (1960) showed that the polymer contained 23 μmoles of phosphorus per gram of polymer, corresponding to reaction of 3'-O-acetylthymidine 5'-phosphate with 11% of the thymidine groups in the starting thymidine polymer.

Exhaustive acid hydrolysis of the product polymer showed an increase of 12% in the thymine content of the starting polymer, in good agreement with the phosphorus analysis results.

A 200 mg. portion of the product polymer was continuously agitated for 24 hours with 10 ml. of 80% acetic acid saturated with benzene, the hydrolysate was separated by filtration and the filtrate was freeze dried to obtain 10.2 mg. of white solid comprising thymidine (T) and thymidylyl-(3'→5') - thymidine - 3' - O-acetate (TpTAc). A portion of this was deacetylated with concentrated ammonium hydroxide to afford a mixture of thymidine and thymidylyl - (3'→5') - thymidine (TpT). Thin layer chromatographic results are summarized in Table III (chromatographic system as described in Example V):

TABLE III

| Compound | Rf | | Rf relative to thymidine | |
|---|---|---|---|---|
| | Expt'l. | Literature Ref. Values [1] | Expt'l. | Calcd. from Literature Ref. Values |
| Thymidine-5'-phosphate (TpT) | 0.16 | | | |
| Thymidine (T) | 0.72 | 0.68 | | |
| TpTAc (this work) | 0.49 | 0.45 | 0.68 | 0.65 |
| TpT (this work) | 0.43 | 0.39 | 0.59 | 0.57 |
| TpT (authentic) | 0.43 | 0.39 | 0.59 | 0.57 |

[1] Schaller et al., J. Am. Chem. Soc., 85, 3,831 (1963).

Thus, comparison of the chromatographic data with literature values and with an authentic sample of TpT prepared by a prior art procedure verifies the constitution of the product polymer.

The aforesaid T+TpTAc mixture was hydrolysed with ammonium hydroxide and the components T and TpT were separated by preparative scale paper chromatography on Whatman 3 MM paper using isopropyl alcohol-conc. $NH_4OH$—$H_2O$ (7:1:2) solvent. The band with an Rf center ≃0.4 was cut out, eluted and lyophilized. A portion of the recovered TpT was dissolved in 0.2 M tris(hydroxymethyl)aminomethane hydrochloride, pH 9, and was incubated overnight at 37° C. with purified snake venom phosphodiesterase; paper chromatography indicated that the product was cleaved to thymidine and thymidine 5'-phosphate and behaved in all respects like a reference sample of authentic TpT prepared by a prior art procedure. Chromatographic data are summarized in Table IV (solvent system as above with Whatman 1 filter paper).

TABLE IV

| Compound: | Rf |
|---|---|
| Thymidine | 0.64 |
| Thymidine 5'-phosphate | 0.12 |
| TpT (this work) | 0.39 |
| TpT+venom (this work) | [1] 0.10 and 0.65 |
| TpT (authentic) | 0.40 |
| TpT+venom (authentic) | [1] 0.11 and 0.64 |

[1] Two spots.

EXAMPLE VII.—PREPARATION OF OLIGONUCLEOTIDES USING THYMIDINE-DIMETHOXYTRITYL-COPOLYMER CARRIER; DIMETHOXYTRITYLTHYMIDYLYL - (3'→5') - THYMIDINE-3'-ACETATE-COPOLYMER

A portion of the dimethoxytrityl chloride polymer prepared for use in Example IIIC was condensed with thymidine in pyridine as described previously. The product polymer contained 220 μmoles of bound thymidine per gram, as indicated by exhaustive hydrolysis.

A mixture of 300 mg. of the above polymer with 40 mg. of anhydrous pyridinium 3'-O-acetylthymidine 5'-phosphate and 125 mg. of dicyclohexylcarbodiimide in 10 ml. of anhydrous pyridine was mixed for 10 days and the product worked up as previously described.

The thymine content of an exhaustive hydrolysate indicated that 18% of the available thymidine in the starting polymer had condensed with the acetylated nucleotide.

EXAMPLE VIII.—REMOVAL OF OLIGONUCLEOTIDE FROM CARRIER POLYMER; RECOVERY OF THYMIDYLYLTHYMIDINE BY CATALYTIC HYDROGENOLYSIS

A 10.46 mg. portion of the dimethoxytritylthymidylyl-thymidine-copolymer of Example VI was suspended in 4 ml. of dimethylformamide and 53 mg. of palladium oxide was added. Hydrogenolysis at room temperature and slightly more than atmospheric pressure of hydrogen gas was allowed to proceed for 4.5 hrs. Filtration afforded a filtrate which was stripped, and the residue was dissolved in 10 ml. of 0.01 N HCl. The $OD_{267\ m\mu}$ was 0.76 indicating substantial removal of thymidine-containing product. A blank sample of polymer similarly treated without hydrogen gave a filtrate which showed no 267 mμ absorption due to thymidine.

The product from the hydrogenolysis filtrate and the product after deacetylation with ammonium hydroxide behaved chromatographically like the TpTAc and the TpT of Example VI.

EXAMPLE IX.—REMOVAL OF 3'-O-PROTECTIVE GROUP PRIOR TO REMOVAL OF OLIGONUCLEOTIDE FROM CARRIER POLYMER

A 1:2:1 by volume mixture of pyridine:benzene:conc. ammonium hydroxide was mixed thoroughly and the bottom aqueous layer was discarded. An 80 mg. portion of the dimethoxytritylthymidylylthymidine-copolymer of Example VI was added to 10 ml. of the pyridine-benzene-ammonia top layer and the mixture was continuously mixed for 42 hours. The deacetylated product was recovered by filtration and washed with pyridine, benzene and water.

The oligonucleotide was removed from the polymer carrier by continuously mixing the polymer with 10 ml. of benzene-saturated 80% acetic acid as previously described in Example VI. The hydrolysate was recovered by filtration, the filtrate was stripped to dryness, and the residue was dissolved in a small amount of water. Paper chromatography, as previously described, showed the product was comprised of two components, one moving identically with thymidine and the second moving identically with an authentic sample of thymidylyl-(3'→5')-thymidine.

EXAMPLE X.—PREPARATION OF OLIGONUCLEOTIDES USING DIMETHOXYTRITYLTHYMIDINE-COPOLYMER CARRIER; DIMETHOXYTRITYLTHYMIDYLYL - (3'→5') - THYMIDYLYL-(3'→5')-THYMIDINE-3'-ACETATE COPOLYMER (A) 15:1 styrene-iodostyrene bead copolymer, crosslinked with 0.75% weight of divinylbenzene A copolymerization as described in Example Ia(4) was carried out, but using only 0.19 ml. of divinylbenzene. The polymer was collected on a 200-mesh screen filter and the product was washed as described. The yield was 82%.

*Analysis.*—Found: C, 85.3; H, 7.2; I, 7.7.

(B) Dimethoxytrityl chloride copolymer

Reaction of the above polymer according to the schemes described in Examples IB(3) and IB(4) afforded the dimethoxytrityl chloride copolymer.

*Analysis.*—Found: C, 89.0; H, 7.3; Cl, 1.1.

(C) Dimethoxytritylthylmidylyl-(3'→5')-thymidine-3'-acetate copolymer

A mixture of 1.0 g. of the chloride copolymer from B above, 0.12 g. of thymidine and 20 ml. of anhydrous pyridine, in a sealed bottle was continuously mixed for 3 days. Without isolating the intermediate thymidine copolymer, the reaction vessel was opened in a dry atmosphere and was charged with 0.6 millimole of pyridinium 3'-O-acetylthymidine-5'-phosphate in 6-ml. of dry pyridine and 1.0 g. of dicyclohexylcarbodiimide. The vessel was resealed and continuously mixed for 3 days. The solid polymer was then collected and washed on the filter with warm pyridine (60° C.) and ethanol then dried in vacuo over phosphorus pentoxide.

To assay the product a 10.63-mg. portion of the product was hydrolyzed by continuously mixing with 3 ml. of 80% acetic acid (saturated with benzene) for 48 hours. The filtrate was stripped dry, then treated for one hour with concentrated ammonium hydroxide, and stripped. The residue was dissolved in 25.0 ml. of water and the ultraviolet absorption spectrum determined;

$$OD_{267m\mu} = 1.25$$

corresponding to 304 μmoles thymidine per gram of polymer. This solution was evaporated to a small volume and the residue quantitatively paper chromatographed as in Example VI. Elution of the two bands and ultraviolet spectroscopic determination indicated that the polymer had bound 146 μmoles of thymidine and 84 μmoles of TpT per gram of polymer.

(D) Removal of the 3'-O-acetyl group

A 200-mg. portion of the preceding copolymer (C) was suspended in a mixture of 9 ml. of pyridine and 3 ml. of concentrated ammonium hydroxide and the mixture was continuously agitated for 9 days. The polymer was collected and washed with warm pyridine and vacuum dried at 70° C. over $P_2O_5$. Hydrolysis as described above and thin layer chromatography of the hydrolysate revealed the presence of thymidine and TpT, but showed no TpTAc as compared with known reference compounds.

(E) Condensation with 3'-O-acetylthmidylate

A mixture of 120 mg. of the polymer obtained in (D) above and 35 μmoles of pyridinium 3'-O-acetylthymidylate in 3 ml. of anhydrous pyridine was allowed to stand at room temperature in a sealed vessel for 1 hour and then 75 mg. of dicyclohexylcarbodiimide was added. The mixture was continuously mixed at room temperature for 2 days and the polymer was collected and washed on the filter with warm pyridine (60° C.) then ethanol and dried as previously described.

A 30.17 mg. portion of the polymer was hydrolyzed by refluxing in 80% acetic acid for one hour. The filtrate was separated, stripped, treated with concentrated ammonia and paper chromatographed as described in Example VI; thymidine, thymidine 5'-phosphate and authentic TpT were spotted on the chromatogram for reference $R_f$s, The developed chromatogram revealed three distinct bands whose $R_f$s, respectively, were 0.20, 0.49 (identical with TpT reference), and 0.69 (identical with thymidine reference). The thymidine 5'-phosphate reference had Rf 0.14. The band with Rf 0.20 has a mobility of 1.44 relative to TpT (i.e., $R_{TpT}$) and thus comprises the trinucleoside diphosphate thymidylyl - (3'→5') - thymidylyl-(3'→5')-thymidine (TpTpT) for which reported mobilities are: Rf 0.21; $R_{TpT}$ 1.40 (see Khorana et al., J. Am. Chem. Soc. 80, 6223 (1958)).

The bands were cut out, eluted with water and the respective amounts of products determined spectrophotometrically; the data are summarized in Table V.

TABLE V

| Band Rf. | Eluant Volume | $OD_{267m\mu}$ | Compound and Amount per g. of polymer |
|---|---|---|---|
| 0.20 | 10.0 | 0.29 | TpTpT, 3.3 μmoles/g. |
| 0.49 | 25.0 | 0.71 | TpT, 32 μmoles/g. |
| 0.69 | 25.0 | 0.92 | Thymidine 80 μmoles/g. |

EXAMPLE XI.—PREPARATION OF OLIGONUCLEOTIDES USING DIMETHOXYTRITYL - N - ANISOYLDEOXYCYTIDINE COPOLYMER; DIMETHOXYTRITYL-N-ANISOYLDEOXYCYTIDYLYL-(3'→5')-THYMIDINE-3'-ACETATE COPOLYMER

A 250-mg. portion of the N-anisoyldeoxycytidine copolymer of Example IIIC was added to a mixture of 100 μmoles of pyridinium 3'-O-acetylthymidylate, 200 mg. of dicyclohexylcarbodiimide, and 4 ml. each of anhydrous pyridine and dimethylacetamide. The sealed reaction vessel was continuously rotated for 6 days at room temperature then the polymer was collected, washed and dried as previously described.

A portion of the polymer product was hydrolyzed with 80% acetic acid as described in Example X(C) and the stripped hydrolysate was allowed to stand overnight with concentrated ammonium hydroxide and paper chromatographed as previously described. Deoxycytidine TpT and anisic acid were spotted on the chromatogram as references. The product separated into three spots as follows:

(1) Rf 0.34 ($R_{TpT}$ 0.79)
(2) Rf 0.61 (identical with deoxycytidine reference)
(3) Rf 0.84 (identical with anisic acid reference)

Thus, the mobility of the slowest component was virtually identical with that reported for the dinucleoside phosphate deoxycytidylyl - (3'→5') - thymidine (see Khorana et al., J. Am. Chem. Soc., 85, 3831 (1963) who reported Rf 0.32, $R_{TpT}$ 0.82 for dCpT).

A bulk chromatogram was run and the slow moving band was eluated, concentrated and subjected to snake venom phosphodiesterase hydrolysis as described in Example VI. Chromatography of the hydrolysate revealed two spots whose mobilities were identical with deoxycytidine and thymidine 5'-phosphate, as expected from venom hydrolysis of dCpT.

The dCpT band from hydrolysis of 20.02 mg. of polymer was eluted with $10^{-2}N$ hydrochloric acid (25.0 ml.); the $\lambda_{max}$ was 273 m$\mu$ (identical with value reported by Khorana et al., J. Am. Chem. Soc., 80, 6220 (1958)). The $OD_{273m\mu}$ was 0.49 corresponding to 29 $\mu$moles of dCpT bound per gram of polymer (calculated from $\epsilon = 21,200$ reported by Khorana et al.).

EXAMPLE XII.—PREPARATION OF OLIGONUCLEOTIDE COPOLYMERS USING ARENESULFONYL HALIDE CONDENSING AGENT

The dimethoxytrityl chloride copolymer of Example XB was converted to the thymidine derivative in the manner of Example IIIB The sample assayed at 160 $\mu$moles bound thymidine per gram of polymer.

A 300 mg. portion of the polymer was added to a mixture 60 $\mu$moles of pyridinium 3'-O-acetylthymidine 5'-phosphate, 25 mg. of p-toluenesulfonyl chloride and 10 ml. of anhydrous pyridine. The mixture was continuously mixed at room temperature for 40 hours. The polymer was collected and washed and dried as before.

Hydrolysis with 80% acetic acid as in Example XC, and paper chromatography as there described showed two bands whose mobilities were identical with TpT and thymidine. Ultraviolet analysis showed the polymer to contain 63 $\mu$moles of TpT and 96 $\mu$moles of thymidine per gram.

As previously indicated, the above examples are intended to demonstrate but not limit the present invention. Hence, although the examples show the preparation of oligonucleotides of the formula given hereinabove wherein $n$ is zero, one or two, it is to be understood that the examples as well as the disclosure provided herein are sufficient to enable one skilled in the art to synthesize any desired oligonucleotide of the above formula wherein $n$ is 0 to 20. Moreover, as indicated above, by the process of this invention, oligonucleotides may be prepared so as to contain any desired sequence of nucleosides. Thus, nucleosides which can be incorporated may all be the same, i.e., contain the same purine or pyrimidine basic moiety. Alternatively, the nucleosides may be varied so that the oligonucleotide will contain a variety of purine or pyrimidine moieties.

The oligonucleotides prepared by this invention are of obvious usefulness in organic chemical research relating to the study of nucleic acids. In addition, the oligonucleotide intermediates made possible by this invention are useful as ultraviolet absorbers. It has been further found that the polymeric intermediates of this invention are useful for the selective separation of aromatic and aliphatic hydrocarbons. The polymeric intermediates of the invention "take up" and are swollen by aromatic hydrocarbons but are unaffected by the aliphatic hydrocarbons as illustrated by the following:

A 15:1 styrene-iodostyrene copolymer crosslinked with 0.5% by weight of divinylbenzene was prepared according to the procedure of Examples IA(4) and XA, but using only 0.12 ml. of the crosslinking agent in the polymerization mixture. This product was converted successively to the dimethoxytrityl alcohol and chloride derivatives as described in Examples IB(3) and IB(4). Condensation of the chloride with thymidine analogously to the scheme of Example IIIB afforded a dimethoxytritylthymidine copolymer which assayed 130 $\mu$moles of bound thymidine per gram of polymer. To 10 ml. of an equal volume mixture of benzene and n-hexane was added 1.0 g. of the polymer and the mixture was agitated for one hour at room temperature. The mixture was pressure filtered and a 360 $\mu$l. portion of the filtrate was diluted to 500 ml. of n-hexane. The UV absorption spectrum was determined and it revealed that the optical density at 255 m$\mu$ (benzene peak) was 0.81. The original solvent mixture showed $OD_{255\ m\mu} = 0.85$. Thus, the polymer had scavenged 4.7% of the benzene from the aliphatic-aromatic solvent mixture.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The high molecular weight oligonucleotide-containing polymer comprised of 0.05 to 0.5 repeat units having the structure

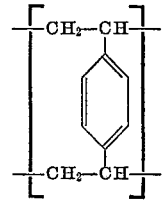

and 2–30 repeat units having the structure

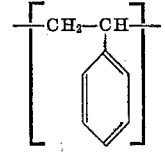

for each repeat unit having the structure

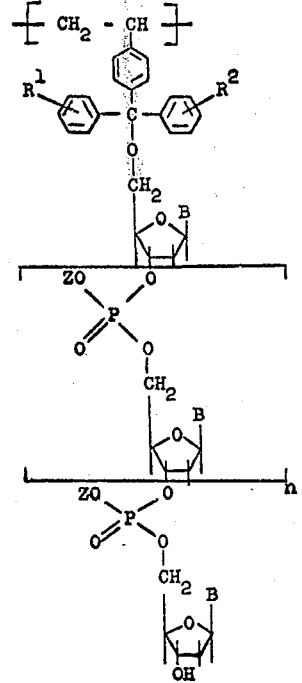

wherein each of $R^1$ and $R^2$ is selected from the group consisting of hydrogen, methoxy and dimethylamino; each Z is selected from the group consisting of hydrogen, pyridinium trialkylammonium, and tetralkylammonium wherein each of said alkyl groups contains 1–4 carbon atoms; n is an integer of from zero to 100; each B is selected from the group consisting of:

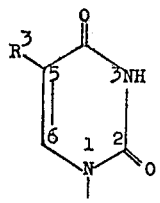

wherein $R^3$ is selected from the class consisting of hydrogen, methyl, chloro and fluoro;

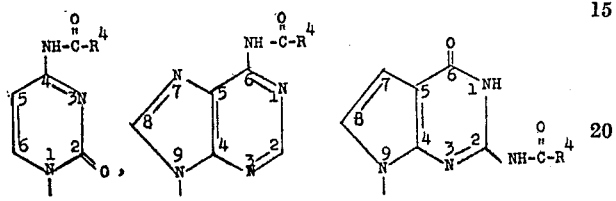

wherein $R^4$ is selected from the class consisting of alkyl of 1–3 carbon atoms, phenyl, methoxyphenyl and alkylphenyl in which said alkyl is 1–3 carbons; 2-triphenyl-methylamino-1,6-dihydro-6-oxo-9-purinyl; 4-amino-1,2-dihydro-2-oxo-1-pyrimidinyl; 6-amino-9-purinyl; and 2-amino-1,6-dihydro-6-oxo-9-purinyl.

2. The polymer of claim 1 wherein $R^1$, $R^2$ and Z are hydrogen and B is 5-methyl-1,2,3,4-tetrahydro-2,4-dioxo-1-pyrimidinyl.

3. The polymer of claim 1 wherein $R^1$ and $R^2$ are methoxy, Z is hydrogen and B is 5-methyl-1,2,3,4-tetrahydro-2,4-dioxo-1-pyrimidinyl.

4. The process of preparing an oligonucleotide of the formula

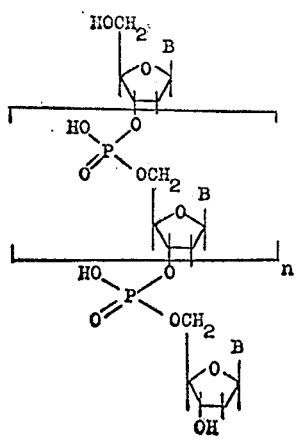

wherein B and n are as defined in claim 1, which comprises the steps of:

(a) copolymerizing by free radical catalysis divinylbenzene, styrene and p-iodostyrene to produce a high molecular weight terpolymer comprised of 0.05 to 0.5 polymer repeat units derived from divinylbenzene and 2 to 30 polymer repeat units derived from styrene for each polymer repeat unit derived from p-iodostyrene;

(b) in the terpolymer of (a), converting, by reaction with an alkyllithium compound, the polymer repeat unit derived from p-iodostyrene to a polymer repeat unit derived from p-lithiostyrene;

(c) reacting the polymer repeat unit derived from p-lithiostyrene, formed in (b), with a benzophenone having the formula $C_6H_4R^1COC_6H_4R^2$, wherein $R^1$ and $R^2$ each is selected from the group consisting of hydrogen, methoxy and dimethylamino, and thence hydrolyzing the reaction product to yield a polymer repeat unit derived from p-(hydroxy-$R^1$,$R^2$-substituted diphenylmethyl)styrene;

(d) converting the hydroxy group of the polymer repeat unit formed in (c) to a chloro group by refluxing the product of (c) with acetyl chloride;

(e) condensing the terpolymer from (d), PTrCl, which contains pendant chloro groups, with a β-D-2′-deoxyribonucleoside, in a basic liquid reaction medium, at 0° to 100° C., for at least one hour, to form a 5′-PTrO-β-D-2′-deoxyribonucleoside, the designation PTr referring to the polymeric carrier containing the triphenylmethyl moiety;

(f) condensing the product of (e) with a 3′-protected nucleoside 5′-phosphate, in a basic liquid reaction medium, at 0° to 100° C., in the presence of a compound which is selected from the group consisting of carbodiimides, aromatic sulfonyl halides, and di-ortho-substituted aromatic carbonyl halides to form a PTr-oligonucleotide;

(g) removing the 3′-protecting group from the product of (f) by a basic hydrolysis;

(h) repeating the sequence of the condensation and hydrolysis reactions (f) and (g) are required to produce a PTr-oligonucleotide of desired chain length and composition;

(i) reacting the product of (h) with 80% aqueous acetic acid to remove the PTr group from the PTr-oligonucleotide of (h); and (j) recovering said oligonucleotide.

5. The process of claim 4 wherein step (j) is effected by means of a hydrolysis carried out with 80% aqueous acetic acid, at 0° to 100° C., for 0.5 to 48 hours.

6. The process of claim 4 wherein step (j) is effected by means of a catalytic hydrogenolysis carried out in a basic liquid reaction medium, at 0° to 100° C. and a hydrogen pressure of 1 to 1000 atm.

7. The process of claim 4 where in step (e) the nucleoside is thymidine and in step (f) the 5′-phosphate is a thymidine 5′-phosphate.

References Cited

UNITED STATES PATENTS 3,287,232  11/1966  Mitsugi et al. _____ 195—28
3,328,389  6/1967   Shimizu et al. _____ 260—211.5

WILLIAM H. SHORT, *Primary Examiner.*

E. NIELSEN, *Assistant Examiner.*

U.S. Cl. X.R.

260—33.6, 211.5